EARLE A. YOUNG
AMBROSE D. BAKER
ROSCOE H. CANADAY
Inventors

Daniel J. Mayne
By Rolla N. Carter
Attorneys

March 5, 1957 E. A. YOUNG ET AL 2,784,251

APPARATUS FOR TRANSLATING INTO LEGIBLE FORM CHARACTERS REPRESENTED BY SIGNALS

Filed Aug. 24, 1950 3 Sheets-Sheet 2

EARLE A. YOUNG
AMBROSE D. BAKER
ROSCOE H. CANADAY
Inventors

By Daniel J. Mayne
Rolla N. Carter
Attorneys

EARLE A. YOUNG
AMBROSE D. BAKER
ROSCOE H. CANADAY
Inventors

Daniel J. Mayne
By Rolla N. Carter
Attorneys

United States Patent Office 2,784,251

Patented Mar. 5, 1957

2,784,251

APPARATUS FOR TRANSLATING INTO LEGIBLE FORM CHARACTERS REPRESENTED BY SIGNALS

Earle A. Young, Ambrose D. Baker and Roscoe H. Canaday, Rochester, N. Y., assignors to Eastman Kodak Company, Rochester, N. Y., a corporation of New Jersey Application August 24, 1950, Serial No. 181,266

15 Claims. (Cl. 178—15)

The present invention relates to electric signaling systems and more particularly to a system for legibly displaying numerical, alphabetic, or other characters represented by external voltages. In another aspect the invention relates to a system for translating received electrical impulses representing characters into contemporaneously visible replicas of the characters which may be read or photographically recorded.

In accordance with a principal feature of the invention, a plurality of signal voltages representative of numerical digits, alphabetic or other characters are legibly displayed as words, including numbers, on the face of a cathode ray tube through the medium of a scanning system having the characters available to be scanned individually to develop a video signal representative of the scansion values of any character as selected by a signal voltage. The signal voltages are applied in selected sequence to accomplish, in turn, the scanning of the characters represented by the signal voltages. The cathode ray tube has a scanning raster the size of a character to be displayed which is shifted in accord with a chosen pattern so that successive characters will appear in the chosen sequence on its screen.

In the fields of instrumentation, computation, communication and the like, information is frequently available in the relatively inconvenient form of voltage patterns which to be useful to a human operator must be translated or interpreted. It is obvious that a device capable of receiving information in various forms (not per se usable) and converting it to optically visible form in the vernacular would eliminate errors of transcription, interpretation and interpolation when read by the operator and when photographically recorded or otherwise stored. Accordingly, it is a primary object of the invention to provide apparatus which will present in legible form the characters represented by electric signals.

Another object of the invention is to provide such an apparatus which is substantially inertialess and of high speed so that a group of signals translated successively may be presented for simultaneous observation or recordation.

A further object of the invention is to provide an apparatus which will present at high speed and in word form on the face of a cathode ray tube information posted on an electronic register.

In one of its specific embodiments the invention may be readily applied as an output device to computing machines, such as ENIAC, and counters, such as RCA Model WF99-B, to display in ordinary numerals the number or word normally posted on a row of neon lamps and thereby eliminate the need for personal transcription which at best is slow and cumbersome and at anything less than the best results in errors.

In applying the invention to a computer or the like, we may assume that each unit of the information of interest appears as a single signal voltage or two related voltages across a plurality of resistors, each voltage or pair of voltages representing a numerical digit. These signal voltages are supplied in any selected sequence to the scanning system to cause it to scan and generate a video signal representative of a character as determined by the magnitude or pattern of a supplied signal voltage. The output video signal is suitably amplified and applied to control the intensity of the electron beam in the cathode ray tube which is driven in synchronism with the scanning raster employed in the scanning system. Thus, by a system common to television practice, the character scanned by the video signal generator is reproduced on the screen of the cathode ray tube. Suitable electronic switching circuits successively connect the video signal generator to the external signal voltages and at the same time successively displace the position of the raster on the cathode ray tube in a horizontal direction or in accord with some other selected pattern so that the several digits represented by voltages on the resistors will be displayed as a number which may be observed or photographed as desired.

Where the external signal voltages are stable for an appreciable length of time, they may be cyclically connected to the video signal generator at a frequency at least equal to the period of persistence of vision so that the complete word is visible on an ordinary cathode ray tube. A complete word may be made visible from a single cycle by using a screen having a suitable time lag of light decay or by storing the input signal and cyclically reading it out from the storage device.

The invention will be understood from the following description when read in connection with the accompanying drawings in which Fig. 1 is a conventionalized showing of an apparatus embodying the invention;

Figure 1:
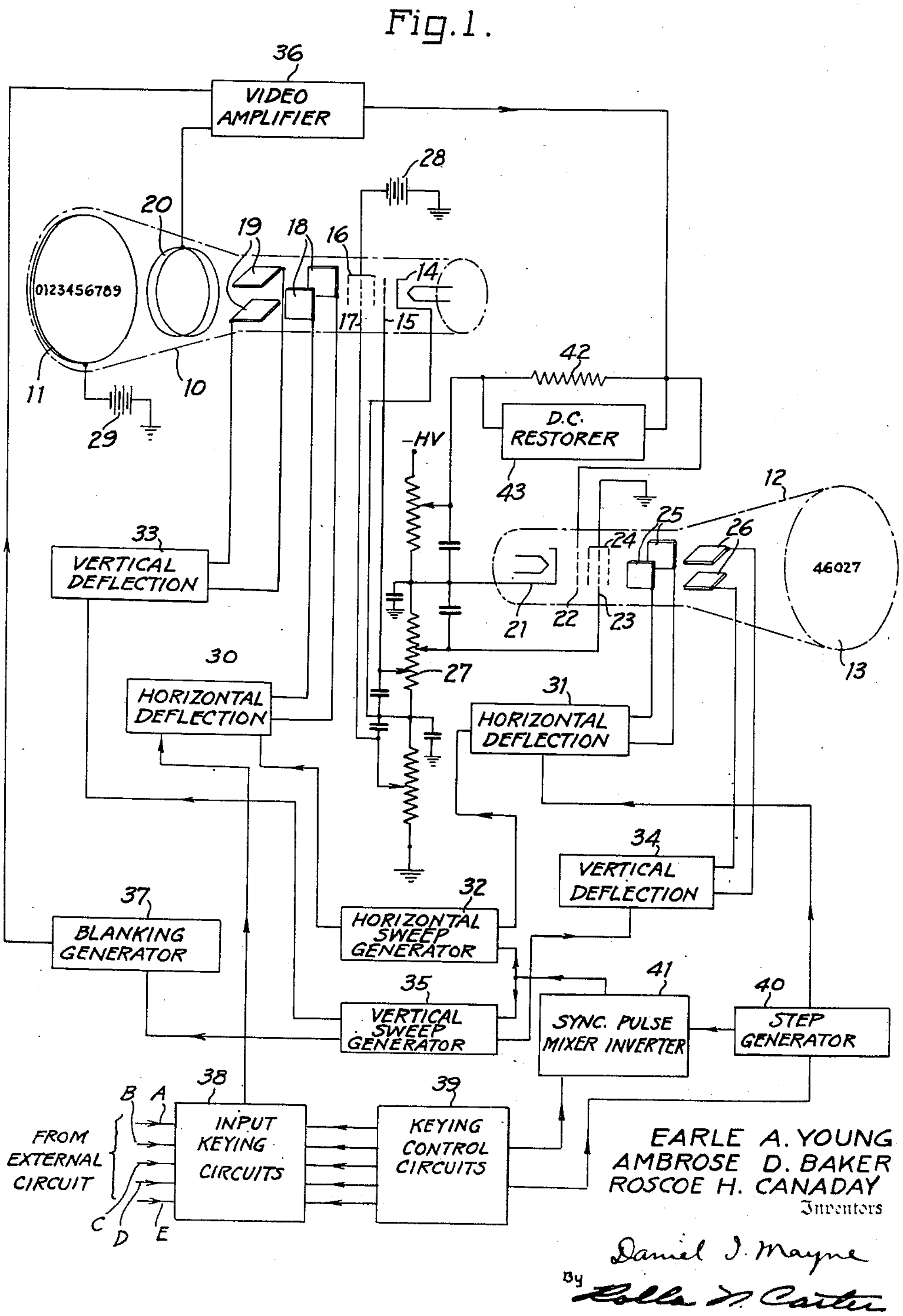

The apparatus diagrammatically shown in Fig. 1 comprises a monoscope type of video signal generator 10 having a target plate 11 of relatively high secondary electron emissive material upon which the ten numerical digits have been printed with a material having relatively low secondary emission qualities and a cathode ray tube 12 having on its face a fluorescent screen 13. The tube 10 is shown provided with a suitable electron gun including a heated cathode 14, a number one grid 15, a number two grid and second anode 16 and a first anode 17, a pair of horizontal deflector plates 18, a pair of vertical deflector plates 19, and a secondary electron collector ring 20. The cathode ray tube 12 is shown provided with an electron gun including a heated cathode 21, a number one grid 22, a first anode 23 and a number two grid and second anode 24, a pair of horizontal deflector plates 25 and a pair of vertical deflector plates 26.

The various potentials required for operation of the tubes 10 and 12 may be derived from a suitably bypassed voltage divider resistor 27 connected to a source of high negative voltage (not shown) although for convenience the drawing shows the number two grid and second anode 16 and the target plate 11 of the tube 10 connected to separate batteries 28 and 29, respectively. The connections to the electron gun elements of the cathode ray tube 12 are made farther toward the negative end of the resistor 27 than those of the electron gun in the tube 10 because higher accelerating potentials are generally desirable in the cathode ray tube 12.

Means, hereinafter described in detail, for providing duplicate scanning rasters on the monoscope tube 10 and the cathode ray tube 12 comprise horizontal deflection circuits 30 and 31 actuated by a common horizontal sweep generator 32 and vertical deflection circuits 33 and 34 actuated by a common vertical sweep generator 35. The size of the scanning raster in the tube 10 is such as to fully cover the area occupied by a single character on its target plate 11 while the scanning raster on the cathode ray tube 12 is of any desired size which will permit simultaneous display on the fluorescent screen 13 of the desired number of characters (here shown as five). The scanning of a character on the target plate 11 of the monoscope tube 10 produces on the collector ring 20 a video signal which is fed through an amplifier 36 to the control grid 22 of the cathode ray tube 12. Thus, by a system common to television practice, the character scanned on the target plate 11 of the monoscope tube 10 is reproduced on the screen 13 of the cathode ray tube 12. Also in accordance with common practice the vertical return trace in the cathode ray tube 12 is blanked by means of a blanking generator 37 under the control of the vertical sweep generator 35.

Voltages proportional in magnitude to the digits represented thereby are applied to the terminals A through E of input keying circuits 38 which under the direction of keying control circuits 39 impress these voltages in proper sequence upon the horizontal deflection circuit 30 to position in the same sequence the scanning raster in the monoscope tube 10 over the numerals on the target plate 11 corresponding to the voltages applied to the terminals A through E, respectively.

The output of the keying control circuits 39 also provides an input signal for a step generator 40 which supplies a series of step voltages to the horizontol deflection circuit 31 to advance horizontally by a desired amount each successive raster scanned in the cathode ray tube 12 so that the characters scanned by the monoscope tube 10 will appear in the sequence scanned at successive points across the face of the cathode ray tube 12. A sync pulse mixer inverter 41 under the joint control of the keying control circuits 39 and the step generator 40 assures complete synchronism betwen the circuits by controlling the horizontal sweep generator 32 at the start of the first horizontal sweep in each raster and by providing the synchronizing pulses which control the start of the second, third, fourth and fifth sweeps of the vertical sweep generator 35. For reasons appearing below, the synchronizing pulse for the first raster is produced by the keying control circuits 39.

As shown in Fig. 1, it has been assumed that the external voltages applied to the terminals A through E represent the numerals 4, 6, 0, 2 and 7, respectively. Thus, when the terminal A is connected through the input keying circuits 38 to the horizontal deflection circuit 30 the position of the scanning raster in the tube 10 is shifted so that it is centered on the numeral 4 on the target plate 11. The resulting video signal on the collector ring 20 is amplified and employed to modulate the intensity of the electron beam in the cathode ray tube 12 whereby the numeral 4 is produced at the extreme left or first position on the screen 13. When the terminal B is connected by the input keying circuits 38 to the horizontal deflection circuit 30 the scanning raster of the tube 10 is positioned on the numeral 6 on the target plate 11 and, as before, the cathode ray tube 12 synthesizes the numeral 6 but this time, due to a change in the voltage provided on the horizontal deflection plates 25 by the step generator 40, the scanning raster is shifted to the right so that the numeral 6 appears in the second position on the screen 13. In a similar manner the voltages on the terminals C, D and E cause the scanning of the numerals 0, 2 and 7 in sequence in the tube 10 so that they are reproduced on the screen 13 as shown.

The input keying control circuits 38 are preferably actuated in a continuous cycle and at a high speed by the keying control circuits 39, sixty complete cycles a second being a convenient speed which permits synchronization with a 60 cycle supply thereby reducing hum problems. Each character is therefore completely scanned in 1/300 second. The control grid 22 of the cathode ray tube 12 has a grid return resistor 42 shunted by a diode rectifier 43 to maintain the background level constant by keeping the control grid bias level to the desired value. The D.-C. restoration thus provided eliminates the need for a direct coupled video amplifier.

Inasmuch as the function of the monoscope tube 10 is to provide video signals of various characters, it may be replaced by any scanning system known to television, e. g., a camera tube upon whose photosensitive screen an optical image of the characters may be formed or a flying spot scanning of a transparency carrying the required characters. Also, with the use of suitable horizontal and vertical amplifiers 30, 31, 33 and 34, electromagnetic deflecting coils may be employed in either or both of the tubes 10 and 12 instead of the electrostatic deflector plates illustrated.

Figure 2:
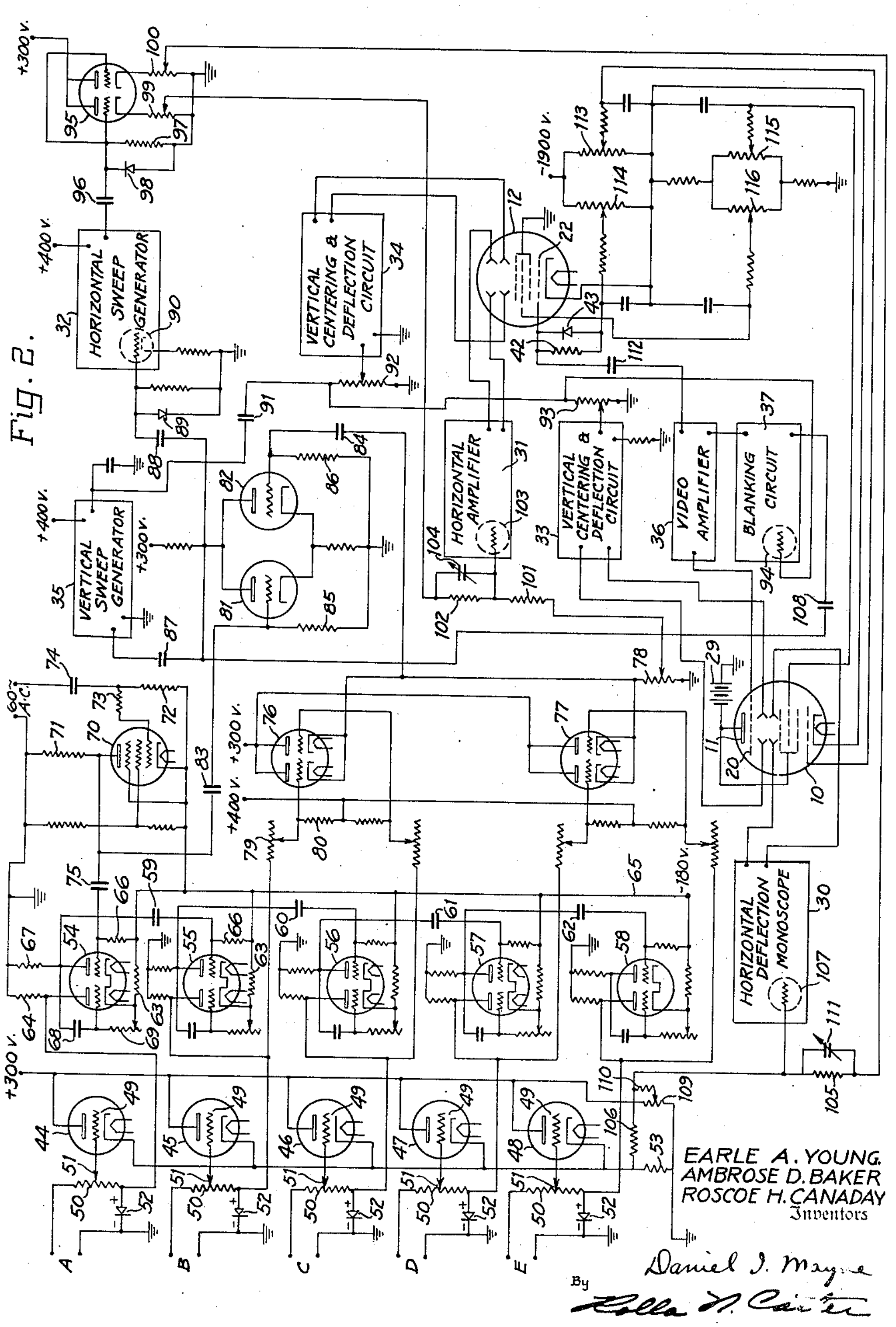
Fig. 2 represents schematically a circuit arrangement employed in the apparatus of Fig. 1.

Referring to Fig. 2, the external circuits A through E are connected to the grids 49 of triodes 44, 45, 46, 47 and 48 through resistances 50 whose terminal potentials with respect to ground are controlled by the circuits A through E, respectively. The desired portion of the voltage across each resistance 50, selected by adjustment of a contact arm 51, appears between the grid 49 and the side of a diode 52 marked +. This side of the diode 52 will normally be sufficiently negative to prevent plate current flow through the associated triode 44 to 48. The triodes 44 to 48 have a common source of plate potential and a common cathode resistor 53. The keying control circuits, next to be described, drive the side marked + of each diode 52 to ground potential in succession sixty times a second so that each of the triodes 44 to 48 in turn conducts to produce a voltage drop across resistor 53. The amplitudes of the voltage drops across the resistor 53 will correspond in succession in the magnitude of the voltages received from the external circuits A through E.

The keying control includes trigger units 54 to 58 which are coupled together through capacitors 59 to 62. Each of these trigger units has right and left hand electron discharge elements, each including a cathode, an anode, and a grid for controlling the conductivity of the element. Under static conditions the left-hand element of each of the units 54 to 58 is conducting and the voltage drop across its cathode resistor 63 exceeds the cut-off value of each right-hand element. The anode of each left-hand element is connected to the + side of the corresponding diode 52 and to ground through an anode resistor 64 so that as long as the left-hand elements are conducting the drop across the anode resistors 64 will cause the side of the diode 52 marked + to become negative with respect to ground and all of the triodes 44 to 48 will be biased beyond cut-off. By proper adjustment of the contacts 51 on the resistance 50, the maximum positive voltage produced by the external signal circuits A through E will not allow the negative bias on the grids 49 to drop to cut-off while the associated left-hand element of trigger units 54 to 58 is conducting.

A sharp positive pulse applied across the right-hand grid input resistor 66 of the unit 54 reduces the bias below the cut-off value and permits anode current to flow through the right-hand element and an anode resistor 67 of the unit 54 to ground which causes this anode to become highly negative with respect to ground. The anode end of the resistor 67 is coupled to the grid of the left-hand elements of the unit 54 through a capacitor 68 and thus when the right-hand anode goes negative the left-hand element ceases conducting and the juncture between the resistance 50 and the diode 52 of the external circuit A assumes ground potential. The signal voltage from the circuit A takes control of the gate tube 44 to produce across the cathode resistor 53 a voltage drop corresponding to the signal from the external circuit A. In a short time, slightly less than 1/300 second, the capacitor 68 will have discharged through a series grid resistor 69 sufficiently to permit the left-hand element of the unit 54 to conduct again, thereby driving to cut-off the right-hand element and restoring stable operation under which the gate tube 44 is cut off.

When the right-hand element of the unit 54 is restored to cut-off condition the voltage across its anode resistor 67 drops to zero and the coupling capacitor 59 applies a positive pulse across the input resistor 66 of the unit 55. The unit 55 now goes through the cycle described above to open the gate tube 45 which permits the external circuit B to provide across the cathode resistor 53 a voltage corresponding to its signal. Thereafter, through the coupling capacitors 60, 61 and 62 the units 56, 57 and 58 are triggered in rapid succession to gate the tubes 46, 47 and 48 so that the signals on external circuits C, D and E have in turn developed a voltage across the resistor 53. The keying and gating circuits now remain idle until the next positive pulse is applied to the input resistor 66 of the trigger tube 54 causing the above-described cycle to repeat.

It has been shown that when unit 54 has been triggered, units 55, 56, 57 and 58 will automatically trigger in sequence. It is, therefore, a requirement that the total time required for one complete cycle be at least slightly less than the time between successive pulses to the unit 54 and thereby avoid the possibility of starting a new cycle at the unit 54 while some other unit further down the chain is still triggered.

The positive pulses for triggering the unit 54 may conveniently be obtained from a square wave generator comprising a tube 70 having at least a cathode, a control grid and an anode, an anode resistor 71, an input resistor 72 and a series grid resistor 73. A 60-cycle input applied to the terminal side of a capacitor 74 permits the application of a high A. C. component across the resistor 72. Very soon after the "high" side of the resistor 72 becomes positive, grid current of the tube 70 clips the grid swing due to the drop across the resistor 73. The negative alternation is clipped due to the high negative voltage causing plate current cut-off in the tube 70. This action results in a square wave pattern being developed across the anode resistor 71 and, after differentiation by a capacitor 75 and the input resistor 66 of the unit 54, a sharp positive pulse is produced across the resistor 66 every 1/60 second. An associated negative pulse is also produced but since the right-hand element of the unit 54 is already biased beyond cut-off, this is of small consequence.

The step generator 40 may comprise two duo-triode tubes 76 and 77 which under the control of the trigger units 55, 56, 57 and 58 produce appropriate voltages across a resistance 78 for shifting the scanning raster of the cathode ray tube 12 horizontally for each successive keying of the gate tubes 45 to 48. The grid of the left-hand element of the tube 76 is connected to the juncture of voltage divider resistances 79 and 80. The resistance 79 is returned to the anode of the left-hand element of unit 55 and is of such value that while the left-hand element of the unit 55 is conducting, the left-hand element of the tube 76 is biased to cut-off and when the left-hand element of the unit 55 stops conducting, as in a keying action, the bias on the left-hand element of tube 76 is reduced so that anode current flows to produce a voltage across the resistance 78 which has an amplitude depending on the ratio between the resistances 79 and 80. The resistance 78 is preferably adjustable for simultaneously controlling the magnitude of all the horizontal step voltages applied to the scanning raster on the cathode ray tube 12 thereby making it possible to justify the characters produced thereon.

Similarly, the right-hand element of the tube 76 has its grid connected to a voltage divider returned to the anode of the left-hand element of the unit 56 so that when this latter element stops conducting, as in a keying action, a voltage drop is produced across the resistance 78 having an amplitude depending on the setting of the voltage divider. In like manner the left and right-hand elements of the tube 77 operate to produce voltage drops across the resistance 78 when the left-hand elements of the units 57 and 58, respectively, do not conduct.

From the above it will be seen that by proper adjustment of the several voltage dividers a voltage step pattern will be produced across the resistance 78 in which the amplitude of the steps may be adjusted as desired. This arrangement for the generation of step voltages has the decided advantage of providing positive synchronization between the input keying circuits 38 and the horizontal step signal for the cathode ray tube 12.

The sync pulse mixer inverter 41 may comprise two triodes 81 and 82 having cathode and anode resistors in common and having their control grids connected by way of condensers 83 and 84, respectively, to the output of the square wave generator and the output of the step generator as it appears on the resistance 78. The action of the condenser 83 and a grid resistor 85 differentiates the square wave and delivers at the desired synchronizing instant a positive pulse across the resistor 85 which causes a momentary increase in plate current and a resulting momentary drop in plate voltage on the triode 81. The action of the condenser 84 and a grid resistor 86 differentiates the step voltages from the resistor 78 and produces four positive pulses and one negative pulse across the resistor 86 which in turn produces four negative voltage pulses on the anode of the triode 82. The four negative pulses due to anode current change in the triode 82 combined with the single negative pulse due to change in the anode current in the triode 81 result in five negative pulses which are applied to the vertical sweep generator 35 through a condenser 87 and to the horizontal sweep generator 32 through a condenser 88 and to the blanking circuit 37 through a condenser 108.

The vertical sweep generator 35 and the horizontal sweep generator 32 are of a conventional Potter multivibrator circuit design and will not be described in detail. However, the horizontal sweep generator 32 includes a novel feature in that its input includes a diode 89 which provides D.-C. clamping at the grid of the multivibrator tube 90 and, due to its clipping action, removes positive swings thereby permitting the application of a larger synchronizing signal and at the same time permitting a reduction in the return time of the horizontal sweep.

The A.-C. component of the output of the vertical sawtooth oscillator 35 is applied through a coupling condenser 91 to a resistance 92, a resistance 93 and the grid of a phase inverter tube 94 in the blanking circuit 37. A selected portion of the signal on the resistance 92 is applied to the vertical deflection circuit 34 which in a well known manner provides vertical centering and push-pull deflection of the electron beam in the cathode ray tube 12. A selected portion of the sawtooth component signal on the resistance 93 is applied to the vertical deflection circuit 33 which in a conventional manner provides vertical centering and vertical deflection of the electron beam in the monoscope tube 10.

The output of the horizontal sawtooth oscillator 32 is coupled to the grids of a duo-triode 95 through a condenser 96 and a grid leak resistor 97. The resistor 97 is shunted by a diode 98 which prevents the grid from being driven negative, thereby reducing distortion of the raster. The duo-triode 95 is connected as two cathode follower isolation stages which provide on the two cathode resistances 99 and 100 the horizontal sawtooth component. The single high impedance circuit of the oscillator 32 is thus in effect transformed into two lower impedance circuits.

A desired portion of the step voltage developed across the resistance 78 and a desired portion of the horizontal sawtooth voltage developed across the cathode resistance 99 are mixed through resistors 101 and 102, respectively; and applied to the grid of the input tube 103 of the horizontal deflection circuit 31 which in a conventional manner provides horizontal amplification and centering for the cathode ray tube 12. A trimmer condenser 104 shunts the resistor 102 to improve the high frequency response.

A desired percentage of the horizontal sawtooth voltage developed across the resistance 100 is mixed with the keyed input voltage developed across the resistor 53 through resistors 105 and 106, respectively, and is applied to the grid of the input tube 107 of the horizontal deflection circuit 30, a push-pull D.-C. amplifier, which provides horizontal amplification and centering for the electron beam in the monoscope tube 10. A condenser is connected in shunt with the resistor 105 to provide high frequency compensation. Thus, the scanning raster of the tube 10 is successively centered over various characters printed on its target plate 11 as the keying tubes 44 to 48 are caused to develop voltages across the resistor 53 as determined by the magnitude of the signals on the input terminals A through E. A centering control potentiometer 109 is also coupled to the grid of the tube 107 through a resistance 110 to provide on this grid an average positive voltage with respect to ground depending on the setting of the potentiometer 109 and the voltage developed across the resistance 53 at any instant.

The secondary electrons emitted by the target plate 11 during scanning are collected by the monoscope collector ring 20 and fed through a conventional video amplifier 36 and a condenser 112 to the grid 22 which controls the intensity of the electron beam in the cathode ray tube 12 to reproduce on its screen 13 the characters scanned by the monoscope tube 10.

An ordinary blanking circuit 37 supplies a square wave pulse to the video amplifier 36 for blanking the cathode ray tube 12 to prevent undesired vertical return lines from appearing on its screen 13. The input signals to the blanking circuit consist of the A.-C. component from the output of the vertical sawtooth oscillator 35 through the coupling condenser 91 and the synchronizing pulses from the sync mixer inverter 41 through the coupling condenser 108.

The circuit for supplying proper operating voltages to the monoscope tube 10 and the cathode ray tube 12 will not be described in detail. It may be well, however, to point out that the potentiometer 113 and the potentiometer 114 provide means for setting the intensities of the electron beams in the monoscope tube 10 and the cathode ray tube 12, respectively; and that potentiometers 115 and 116, respectively, provide focus control for the monoscope tube 10 and the cathode ray tube 12.

It will be apparent from the above that the invention provides a device for displaying a fugitive record of a series of numerical digits, letters or other characters on the face of a cathode ray tube at very high writing speeds. When employed with a suitable recorder, such as a camera, the device is adaptable as an output means for electronic computers, photo-typesetting machines, or means for rapid communication over wire or radio. The line of characters may be displayed simultaneously on a number of cathode ray tubes and, by scanning the same line repeatedly, the displayed data can be reproduced continuously for any desired interval of time.

Figure 6:
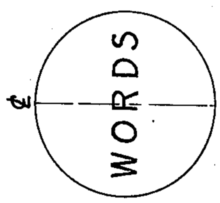
Figs. 5 and 6 illustrate true justification.
Figure 5:
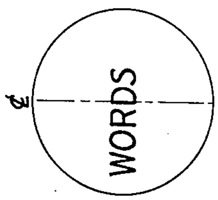
Figure 4:
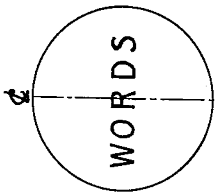
Figs. 3 and 4 illustrate the type of justification obtainable with the circuit of Fig. 2.
Figure 3:
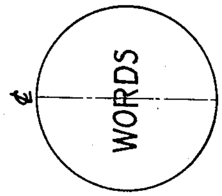

As was mentioned above, adjustment of the input to the horizontal amplifier 31 by varying the portion of the signal taken from the resistance 78 will vary the horizontal spacing between the several characters produced on the face of the cathode ray tube 12. When using an ordinary A.-C. coupled amplifier 31 this displacement or justification will take place on each side of the center line of the face 13 of the cathode ray tube 12 as illustrated in Figs. 3 and 4. True justification requires that the left margin of a word or line be held constant as indicated in Figs. 5 and 6 and, since the use of the invention in photo-typesetting is contemplated, one suitable arrangement for obtaining true justification will now be described.

Figure 7:
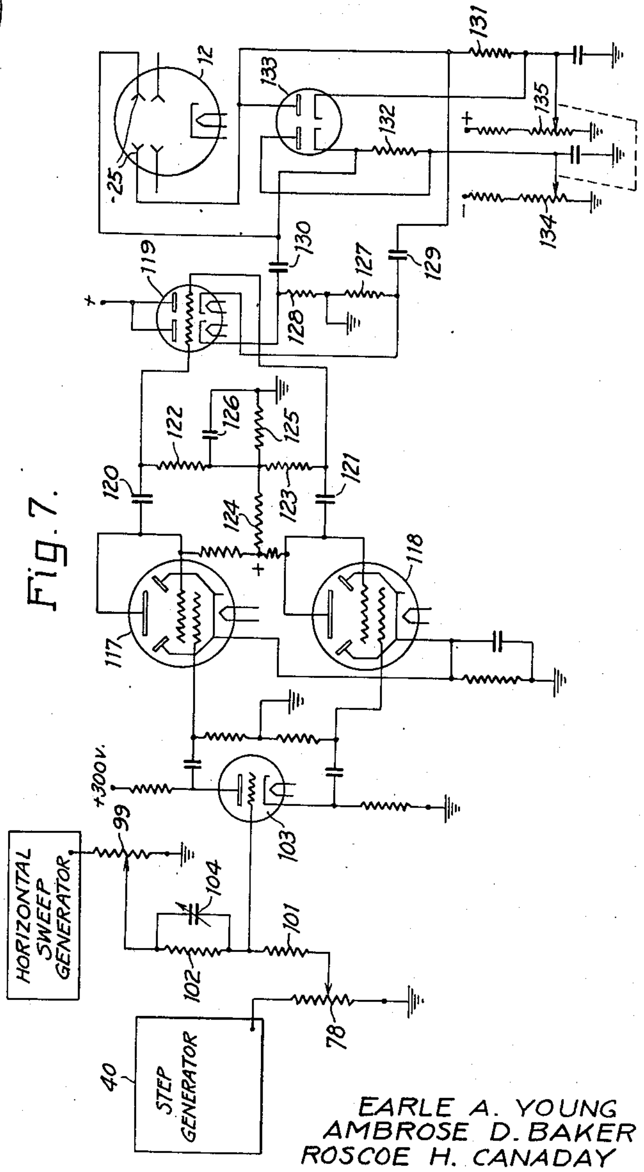
Fig. 7 represents a modification of the arrangement of Fig. 2 adapted to provide true justification.

Referring to Fig. 7, a portion of the step voltage across the resistance 78 and a portion of the sawtooth voltage developed across the resistance 99 are mixed, as above described, at the grid of the tube 103 which is connected with electron tubes 117 and 118 to provide an amplifier and phase inverter. The combined step and sawtooth components which appear 180° out of phase on the plates of the tubes 117 and 118 are coupled to the grids of the left- and right-hand elements, respectively, of a duo-triode tube 119 through condensers 120 and 121. Grid return resistors 122 and 123 are provided with proper grid return potential through voltage divider resistors 124 and 125, the latter of which has a by-pass condenser 126. Cathode resistors 127 and 128 provide load for the elements of the tube 119.

The outputs of the tube 119 appearing across the resistors 127 and 128 are coupled through condensers 129 and 130 to the horizontal deflecting plates 25 of the cathode ray tube 12. The condensers 129 and 130 and their associated resistors 131 and 132 form a coupling network for the A.-C. component of the output signal from the tube 119 to a twin diode clamping tube 133. The tube 119 acts as an impedance transformer and provides the low impedance circuit required by the diode 133 for proper clamping action without distorting the horizontal sawtooth component of the first raster. Potentiometers 134 and 135 having a common control of their settings are adjusted to provide the desired positioning of the characters on the face of the cathode ray tube 12.

The action of the twin diode tube 133 restores the D.-C. component and thus, in effect, changes the reference point from the average value of the step wave to the base of the step wave. Accordingly, adjustment of the resistance 78 varies the spacing of the characters displayed without altering the position of the left-hand character. The control of justification amplitude performed by the adjustment of the resistance 78 may be accomplished either manually or automatically as desired. By expanding the circuits of Fig. 2 to provide additional horizontal raster positions on the cathode ray tube the number of characters may be increased to include a full line of type as required in newspaper or book composition.

It is also possible to arrange the characters in a selected pattern such as a rectangle on the target plate of the monoscope tube. By means of duplex input keying and control circuits, both a horizontal and a vertical deflection of the raster can be accomplished to select the character in response to two related input signals. Such a method is very useful in adapting the invention to certain computer circuits where the arrangement of the characters on the monoscope target plate can be made compatible with signal voltages already available in a resistance matrix of the computer. By adding additional step generators and keying circuits, it is likewise possible to display the characters on the cathode ray tube screen in multiple rows or in a selected pattern such as a circle.

While only five horizontal rasters are provided in the apparatus described, it will be appreciated that many more can be provided by increasing the number of keying and keying control circuits. Also, it will be evident to those skilled in the art that all of the characters available for reproduction need not be associated with a single scanning device but may be distributed among several such devices and in fact some advantages are gained by providing a separate scanning device for each character made available.

What we claim as new and desire to secure by Letters Patent of the United States is:

1. In a signal system for visibly displaying a plurality of characters represented as voltages posted on an electric register, a video signal generator tube having a target electrode provided in separate areas with all characters which may be posted on the electric register, means connected to the electric register for developing in the video signal generator tube a scanning raster the size of a character area, means cyclically impressing the posted voltages on the video signal generator tube, means connected to the scanning raster means and responsive to each cyclically impressed voltage for centering the scanning raster upon the character on the target electrode representative of the cyclically impressed voltage, whereby a series of video signals is derived, and a cathode ray tube connected to the video signal generator tube and responsive to the video signals for visibly displaying the characters conveyed by the video signals.

2. In a signalling system in accordance with claim 1 wherein the video signal generator tube is a cathode ray tube having a target plate with characters formed thereon of a material having secondary electron emissive quality different from that of the target plate.

3. In a signal system, the combination with an electric register operable to provide a plurality of voltage patterns indicative of a plurality of characters, of a video signal generator tube having a target plate provided with all characters which may be posted on the electric register, means connected to the electric register for developing in the video signal generator tube a scanning raster the size of a character area for selectively scanning any one of the characters on the target plate when a voltage pattern indicative of that character is applied to the register, and keying circuits connected to the scanning raster of the video signal generator tube for applying in rapid succession to the video signal generator tube the voltage patterns on the electric register, whereby a series of video signals representing the characters indicated by the voltage patterns are produced.

4. In a signal system in accordance with claim 3 and wherein the electric register comprises a plurality of resistances across which the voltage patterns appear as voltage drops.

5. In a signalling system, means including a video signal generator for generating and transmitting a series of video signals initiated and controlled by a plurality of voltage patterns indicative of a plurality of characters, a cathode ray tube connected to the video signal generator and including a fluorescent screen, means for forming a cathode ray, and a ray-deflecting system for producing a scanning raster on the fluorescent screen, means responsive to the transmitted video signals for controlling the intensity of the cathode ray, and means connected to the ray-deflecting system for progressively adjusting the centering control voltages on the cathode ray tube in synchronization with the video signals representing the image content of successive rasters, whereby the fluorescent screen displays the characters composed in the order their video signals were generated.

6. In a signalling system in accordance with claim 5 wherein the means connected to the ray-deflecting system includes means for adjusting the relative positions of the successive rasters in the direction of normal mutual orientation of the characters represented thereby.

7. In a signalling system in accordance with claim 5 wherein the means connected to the ray-deflecting system includes means for adjusting the amplitude of the step change in horizontal centering for varying the spacing of the characters displayed on the fluorescent screen whereby each line of characters displayed may be justified.

8. A system for visibly displaying in legible form characters represented by electric voltages posted on an electric register whereby the posted voltages are translated by an electronic circuit including means having a replica of each character which may be posted on the register means responsive to the voltages for selectively scanning each replica for generating a group of picture signals representative thereof, means for cyclically connecting and disconnecting in a fixed sequence the posted electric voltages to the voltage responsive means of the picture signal generating means to accomplish a complete scanning in succession of the replicas of the characters represented by the posted electric voltages, thereby deriving successive groups of picture signals representative of the characters, means connected to the picture signal generating means for transmitting said groups of picture signals, means for receiving said groups of transmitted picture signals, and means connected to the receiving means for reproducing successive complete television images in accordance with said successive groups of picture signals.

9. A system in accordance with claim 8 wherein the reproducing means includes means for displacing the successive complete television images with respect to the preceding image.

10. A system for presenting in legible form the characters represented by a series of received signals comprising an array of all the characters to be represented by the received signals, circuit means connected to and controlled by the received signals for selectively scanning individual characters in the array, means connected to the circuit means for deriving successive groups of picture signals representative of the characters scanned, and means responsive to the successive groups of picture signals for displaying separately and visually simultaneously the different characters that correspond to the series of received signals.

11. A system for translating a plurality of voltage patterns representative of a plurality of characters into fugitive pictorial records of the characters comprising means including a video signal generator for generating picture signals representative of each character, a cathode ray tube connected to the video signal generator for converting picture signals into legible images, a source of direct current voltage pulses representative of the characters, means connected to the video signal generator and responsive to pulses representative of the characters for selectively applying to the cathode ray tube picture signals representative of the characters, and means connected to the video signal generator for admitting the voltage pulses from the source in sequence to the responsive means.

12. In a signal system, the combination with a signal input means operable to provide a plurality of voltage patterns individually indicative of one of a plurality of characters, means having a replica of each character which may be posted on the signal input means, and including means for selectively scanning any one of the replicas and means for generating a video signal representative of the scansion values thereof, means connected to the signal input means for dispensing the voltage patterns in series to the scanning means, means connected to the signal input means and initiated and controlled by the voltage patterns received therefrom for selecting the replica to be scanned by the scanning means, whereby a series of video signals are derived, an image-reproducing cathode ray tube connected to the video signal generating means and having circuit means for producing a scanning raster therein, means for applying the derived video signals to the cathode ray tube for adjusting the centering of the scanning raster after each successive video signal, said adjusting means being actuated in synchronism with said dispensing means.

13. The signal system set forth in claim 12 wherein means is provided for generating a square wave, the voltage pattern dispensing means comprises a gating circuit whose gating pulses are derived from the square wave, and means actuated by the square wave synchronizes the gating and raster centering adjusting means.

14. In a data recording device, an electron discharge device comprising means for producing cathode rays, a source of signal energy, cathode ray accelerating means for causing said cathode rays to impinge upon said source so as to generate said signal energy, a sensing means positioned so as to be influenced by said signal energy, a mosaic of symbol-containing areas disposed relative to said source for varying said signal energy so as to influence said sensing means correspondingly to symbols represented by said symbol-containing areas, cathode ray deflecting means associated with said electron discharge device including sweep means for causing said cathode rays to scan a region of said source proportional to one of said symbol-containing areas and positioning means for causing said cathode rays to scan in a plurality of different random selected orders a plurality of regions of said source corresponding to a plurality of symbol-containing areas representing symbols to be recorded, a cathode ray tube comprising a screen and means for producing cathode rays, cathode ray deflecting means associated with said cathode ray tube including sweep means for causing said cathode rays in said cathode ray tube to scan a part of said screen in synchronism with said sweep means associated with said electron discharge device and positioning means for selectively positioning the scanning areas in a sequential order across said screen, and means for modulating said cathode rays in said cathode ray tube with voltage pulses derived from said sensing means so as to reproduce symbols on said screen corresponding to said symbol-containing areas scanned.

15. In a data recording device, an electron discharge device comprising means for producing cathode rays and a screen having the property of emitting energy radiations under the influence of said cathode rays, a sensing means positioned so as to be influenced by said energy radiations, a mosaic of symbol-containing areas disposed relative to said screen so that said energy radiations impinge upon said sensing means in accordance with symbols represented by said symbol-containing areas, cathode ray deflecting means associated with said electron discharge device including sweep means for causing said cathode rays to scan a region of said screen proportional to one of said symbol-containing areas and positioning means for causing said cathode rays to scan in a plurality of different random selected orders a plurality of regions of said screen corresponding to a plurality of said symbol-containing areas representing symbols to be recorded, a cathode ray tube comprising means for producing cathode rays and a screen, cathode ray deflecting means associated with said cathode ray tube including sweep means for causing said cathode rays to scan a part of said screen in said cathode ray tube in synchronism with said sweep means associated with said electron discharge device and positioning means for selectively positioning the scanning areas in a sequential order across said screen, and means for modulating said cathode rays in said cathode ray tube in accordance with voltage pulses derived from said sensing means so as to reproduce symbols on said screen of said cathode ray tube in accordance with said symbol-containing areas scanned.

References Cited in the file of this patent

UNITED STATES PATENTS

| | | |
|---|---|---|
| 1,660,886 | Randall | Feb. 28, 1928 |
| 1,978,684 | McCreary | Oct. 30, 1934 |
| 2,098,390 | Iams | Nov. 9, 1937 |
| 2,207,716 | Bumstead | July 16, 1940 |
| 2,219,149 | Goldsmith | Oct. 22, 1940 |
| 2,275,017 | McNaney | Mar. 3, 1942 |
| 2,275,898 | Goldsmith | Mar. 10, 1942 |
| 2,277,192 | Wilson | Mar. 24, 1942 |
| 2,283,383 | McNaney | May 19, 1942 |
| 2,379,880 | Burgess | July 10, 1945 |
| 2,433,340 | Burgess | Dec. 30, 1947 |
| 2,458,030 | Rea | Jan. 4, 1949 |
| 2,528,725 | Rines | Nov. 7, 1950 |
| 2,538,065 | Wallace | Jan. 16, 1951 |